United States Patent [19]
de Schepper et al.

[11] Patent Number: 5,683,328
[45] Date of Patent: Nov. 4, 1997

[54] SHIFT CONTROL SYSTEM OF AUTOMATIC TRANSMISSION

[75] Inventors: Frank de Schepper, Tombeek-Overijse, Belgium; Kenji Suzuki, Okazaki, Japan

[73] Assignee: Aisin Aw Co., Ltd., Japan

[21] Appl. No.: 616,725

[22] Filed: Mar. 15, 1996

[30] Foreign Application Priority Data

Mar. 16, 1995 [JP] Japan ...................... 7-057753

[51] Int. Cl.$^6$ .................................... F16H 63/00
[52] U.S. Cl. .................... 477/120; 477/70; 477/80; 477/143; 477/154
[58] Field of Search ...................... 477/70, 72, 80, 477/86, 120, 121, 130, 143, 154, 156

[56] References Cited

U.S. PATENT DOCUMENTS

| | | | |
|---|---|---|---|
| 4,557,162 | 12/1985 | Fukunaga | 477/70 X |
| 4,998,451 | 3/1991 | Sano | 477/143 X |
| 5,075,858 | 12/1991 | Narita | 477/154 X |
| 5,086,665 | 2/1992 | Milunas et al. | 477/143 X |
| 5,168,449 | 12/1992 | Benford | 477/146 X |
| 5,514,051 | 5/1996 | Heid et al. | 477/120 |
| 5,559,694 | 9/1996 | Kraemer et al. | 477/109 X |

*Primary Examiner*—Khoi Q. Ta
*Attorney, Agent, or Firm*—Lorusso & Loud

[57] ABSTRACT

A shift control system for an automatic is designed to prevent engine racing and clutch tie-up during a clutch-to-clutch shift (clutch switching shift) involving engagement/disengagement of first and second frictional engagement elements. The shift control system includes an engagement force controller for independently controlling both of the frictional engagement elements. A gear ratio calculator continuously calculates a gear ratio r of the transmission and a shift characteristic value calculator calculates a shift characteristic value $\alpha$ based on changes in the gear ratio between the start of the shift and completion of the shift. A control value calculator calculates a control value $\beta$, based on the shift characteristic value $\alpha$ calculated by the shift characteristic value calculator and a shift characteristic value $\alpha I$ on an ideal gear ratio curve. The control value $\beta$ is calculated so that the shift characteristic value $\alpha$ coincides with the shift characteristic value $\alpha I$ on the ideal gear ratio curve.

8 Claims, 4 Drawing Sheets

SHIFT CONTROL SYSTEM OF AUTOMATIC TRANSMISSION

BACKGROUND OF THE INVENTION

1. Field of the Invention

The present invention relates to a shift control system of an automatic transmission.

2. Description of Prior Art

Conventionally, engine output is transmitted to a transmission via a torque converter. The transmission changes the rotational speed and then outputs the torque to driving wheels. The transmission includes a gear unit composed of a plurality of gear elements and provides a plurality of speeds by selectively engaging/disengaging the gear elements through frictional engaging elements such as clutches and brakes.

It sometimes becomes necessary to disengage a certain frictional engaging element and to engage another frictional engaging element at the same time, in shifting from one speed to another. In this situation, timings for disengaging and engaging the frictional engaging elements (hereinafter referred to as "clutch switching") are adjusted by means of one-way clutches.

However, one-way clutches are required for each shift involving clutch switching of two frictional engaging elements (hereinafter referred to as "clutch switching shift"), thereby not only increasing the size of the automatic transmission but also complicating its structure.

Automatic transmissions in which the one-way clutches are eliminated and the timing of clutch switching of two frictional engaging elements are adjusted by controlling hydraulic pressures supplied to hydraulic servos of the two frictional engaging elements have been developed. For example, in a clutch-to-clutch (clutch switching) shift involving disengagement of one clutch and engagement of another clutch, the clutch switching timings are adjusted by reducing the hydraulic pressure supplied to the hydraulic servo of one clutch and by increasing the hydraulic pressure supplied to the hydraulic servo of the other clutch. However, when the frictional engaging element to be disengaged is disengaged before the frictional engaging element to be engaged is completely engaged, the load on the engine is temporarily sharply reduced, thus causing engine racing. Further, when the frictional engaging element to be engaged is engaged before the frictional engaging element to be disengaged is completely disengaged, a tie-up results in the transmission, thus causing a shift shock.

Accordingly, prevention of engine racing and tie-up requires controlling the hydraulic pressure supplied to the hydraulic servo of each frictional engaging element. However, it is technically difficult to detect that tie-up has occurred. Accordingly, the timing of a clutch-to-clutch shift is weighted to the side where engine racing is caused and the clutch switching timing is corrected so that engine racing is eliminated when it is detected to have occurred. However, because the clutch switching timing is weighted toward the side of engine racing in the prior art shift control system, it is difficult to completely eliminate the engine racing, even though it may be reduced. Accordingly, engine racing, though it is minor, occurs every time when a shift such as the clutch-to-clutch shift is made, causing driver discomfort.

Further, although the ideal is that the gear ratio, between the time when the shift is started to when it is ended, changes in a straight line or an S-shaped curve close to a straight line, in order to shift smoothly without shift shock, the gear ratio changes to the side of engine racing right after the shift is started because the clutch switching timing is set on the side toward engine racing. Therefore, the shift cannot be made smoothly because the gear ratio cannot be changed along the ideal gear ratio curve.

SUMMARY OF THE INVENTION

Accordingly, it is an object of the present invention to solve the aforementioned problems of the prior art shift control system for automatic transmissions by providing a shift control system which results in neither engine racing nor tie-up when a clutch-to-clutch shift is made, thus providing a smooth shift by changing the gear ratio along the ideal gear ratio curve.

In order to achieve the aforementioned object, the present invention provides a shift control system for an automatic transmission including: a plurality of frictional engaging elements for performing a clutch switching shift; a plurality of hydraulic servos for engaging/disengaging the plurality of frictional engaging elements; engaging force control means for controlling supply/draining of hydraulic pressure to/from the plurality of hydraulic servos independently; gear ratio calculating means for calculating the gear ratio of the transmission; shift characteristic value calculating means for calculating a shift characteristic value based on changes in the gear ratio from the start to the end of the shift; and control value generating means for calculating a control value based on the shift characteristic value calculated by the shift characteristic value calculating means and a shift characteristic value which corresponds to an ideal gear ratio curve. The engaging force control means controls the supply/draining of hydraulic pressure to/from the plurality of hydraulic servos in accordance with the control value generated by the control value generating means.

According to another aspect of the invention, the control value generating means compares the shift characteristic value calculated by the shift characteristic value calculating means with the shift characteristic value which corresponds to the ideal gear ratio curve. It then reduces at least either (1) the control value which is the stand-by hydraulic pressure just before the disengagement of a frictional engaging element or (2) the control value which is the stand-by hydraulic pressure just before engagement of a frictional engaging element, when the shift characteristic value calculated by the shift characteristic value calculating means is greater than the shift characteristic value which corresponds to the ideal gear ratio curve. On the other hand, the control valve generating means increases at least either (1) the control value which is the stand-by hydraulic pressure just before disengagement of a frictional engaging element or (2) the control value which is the stand by hydraulic pressure just before engagement of a frictional engaging element, when the shift characteristic value calculated by the shift characteristic value calculating means is less than the shift characteristic value which corresponds to the ideal gear ratio curve.

According to another aspect of the invention, the shift characteristic value is the centroid of the area under a curve for the actual gear ratio, between the start of the shift and the end of the shift.

According to another aspect of the invention, the centroid is represented by a percentage with the centroid position at shift starting time being taken as 0% and the position at the end of the shift being taken as 100%.

In one preferred embodiment of the invention, the engaging force control means is a linear solenoid.

In another preferred embodiment, the control system of the invention further includes input revolution detecting means for detecting the rotary speed of the input shaft and output revolution detecting means for detecting the rotary speed of the output shaft, and the gear ratio calculating means calculates the gear ratio based on signals from the input revolution detecting means and the output revolution detecting means.

As noted above, the gear ratio calculating means repeatedly calculates the gear ratio of the transmission during the time from the start of the shift to the completion of the shift and the shift characteristic value calculating means then calculates the shift characteristic value based on the changes of the gear ratio. The control value is calculated so that the shift characteristic value coincides with the shift characteristic value on the ideal gear ratio curve to thereby independently control the first and second frictional engaging elements.

The present invention thereby achieves the objective of avoiding both engine racing and tie-up during a clutch switching shift, and further avoids disruption of driving comfort. Further, because the gear ratio during the transition of the shift is changed along the ideal gear ratio curve, the shift proceeds smoothly.

DESCRIPTION OF PREFERRED EMBODIMENT

A preferred embodiment of the present invention will be explained in detail below with reference to the drawings.

Figure 1:
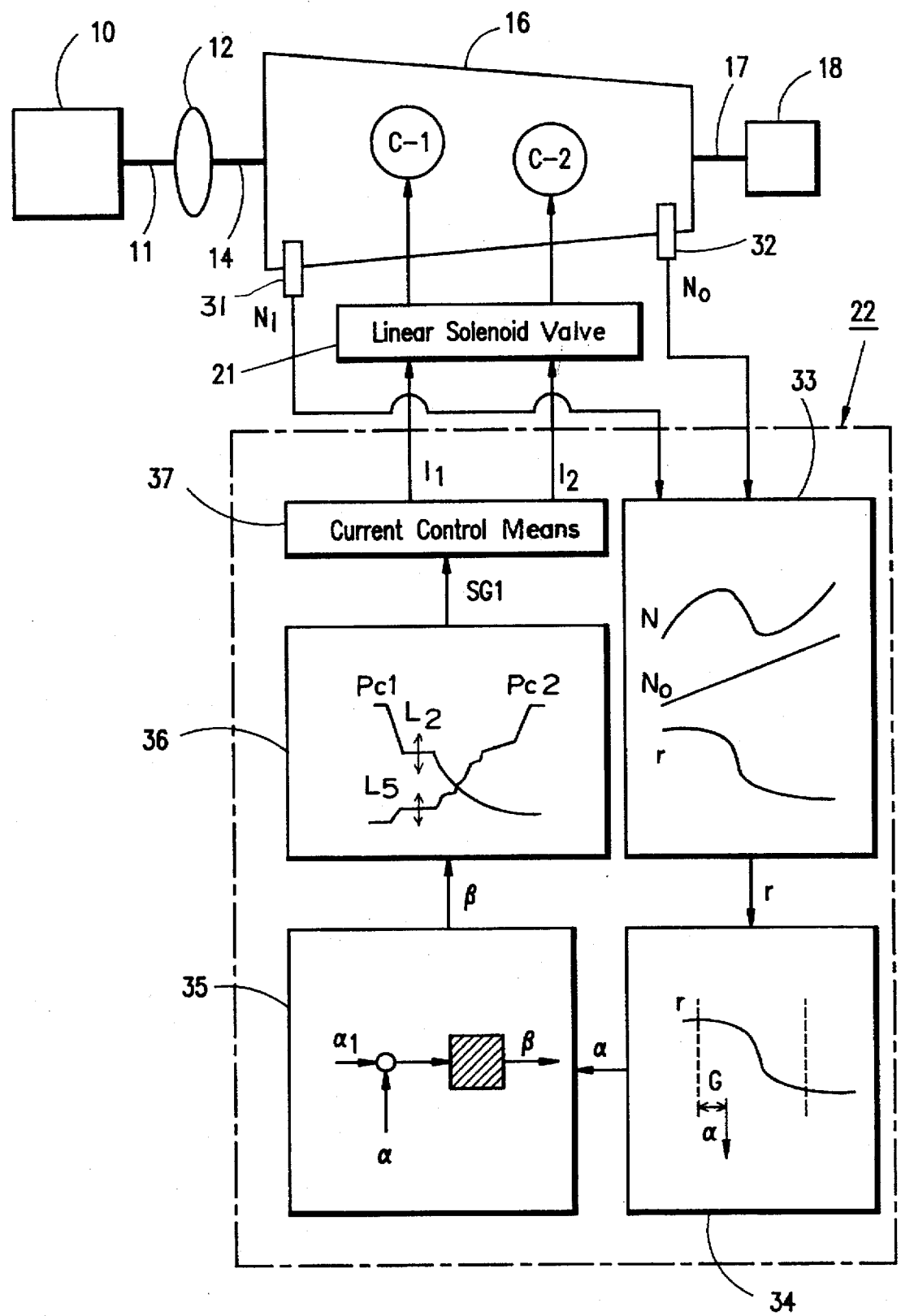
FIG. 1 is a diagram of a shift control system for an automatic transmission according to one embodiment of the present invention.

As shown in FIG. 1, the rotation of an engine 10 is transmitted via an output shaft 11 to a torque converter 12 which serves as a fluid transmission. The output rotation of the torque converter 12, in turn, is transmitted to a transmission 16 via an input shaft 14 to increase/decrease the speed thereof. The rotation is transmitted from the transmission 16 to a differential gear unit 18 via an output shaft 17 and then to the driving wheels (not shown).

The transmission 16 comprises a gear unit, such as a conventional planetary gear unit, and a plurality of frictional engagement elements, such as clutches and brakes, for providing a plurality of speeds. It attains the gear ratio corresponding to each speed by selectively combining various gear elements in the transmission by selectively engaging/disengaging the frictional engagement elements.

In the present embodiment, the transmission 16 has first and second clutches (not shown) for changing gears and is provided with a hydraulic servo C-1 for engaging/disengaging the first clutch and a hydraulic servo C-2 for engaging/disengaging the second clutch, respectively. When a hydraulic pressure is supplied to hydraulic servo C-1 and/or the hydraulic servo C-2, respectively, the first and/or second clutches are engaged and when the hydraulic pressure is drained from the hydraulic servo C-1 and/or the hydraulic servo C-2, the first and/or second clutches are disengaged.

The hydraulic servos C-1 and C-2 are disposed in a conventional hydraulic circuit which includes, in addition to hydraulic servos C-1 and C-2, a primary regulator valve for generating a line pressure, a manual valve for providing a range pressure corresponding to a selected range, a plurality of shift solenoid valves turned On/Off to establish each speed, a 1–2 shift valve, a 2–3 shift valve and a 3–4 shift valve switched responsive to On/Off signals from the shift solenoid valves and a linear solenoid valve 21.

The linear solenoid valve 21, provided as an engaging force control means, generates a hydraulic pressure (hereinafter referred to as "control hydraulic pressure"), in proportion to a current value, for independently controlling the engaging force(s) of the first and/or second clutches.

For purpose of explaining the present embodiment a clutch switching shift involving engaging the second clutch while disengaging the first clutch is described. Accordingly, a control hydraulic pressure Pc1 is supplied to the hydraulic servo C-1 of the first clutch and a control hydraulic pressure Pc2 is supplied to the hydraulic servo C-2 of the second clutch by the linear solenoid valve 21.

An input speed sensor 31 serves as input rotary speed detecting means and an output speed sensor 32 serves as output rotary speed detecting means, both of which send control signals to output rotary speed control unit 22. As shown in FIG. 1, the control unit 22 includes gear ratio calculating means 33, shift characteristic value calculating means 34, control value generating means 35, shift logic setting means 36 and current control means 37.

The input speed sensor 31 detects the rotary speed $N_I$ of the input shaft 14 at the input side of the transmission 16 and the output speed sensor 32 detects the rotary speed $N_O$ of the output shaft 17 on the output side of the transmission 16. Although the input side rotary speed $N_I$ is detected as the rotary speed of the input shaft 14 and the output side rotary speed is detected as the rotary speed of the output shaft 17 in the present embodiment, the rotary speed of another member may be detected so long as its rotary speed is the same as that of the input or output of the transmission 16.

The gear ratio calculating means 33 calculates a gear ratio r:r=$N_I/N_O$ for the transmission 16 based on the input side rotary speed $N_I$ and the output side rotary speed $N_O$. The gear ratio r is calculated at every sampling interval during the transition period between the start of the shift and the end of the shift. The calculated gear ratio r is output to the shift characteristic value calculating means 34.

The shift characteristic value calculating means 34 calculates a shift characteristic value α which represents an actual shift characteristic based on the inputted gear ratio r, and outputs it to the control value generating means 35.

Figure 2:
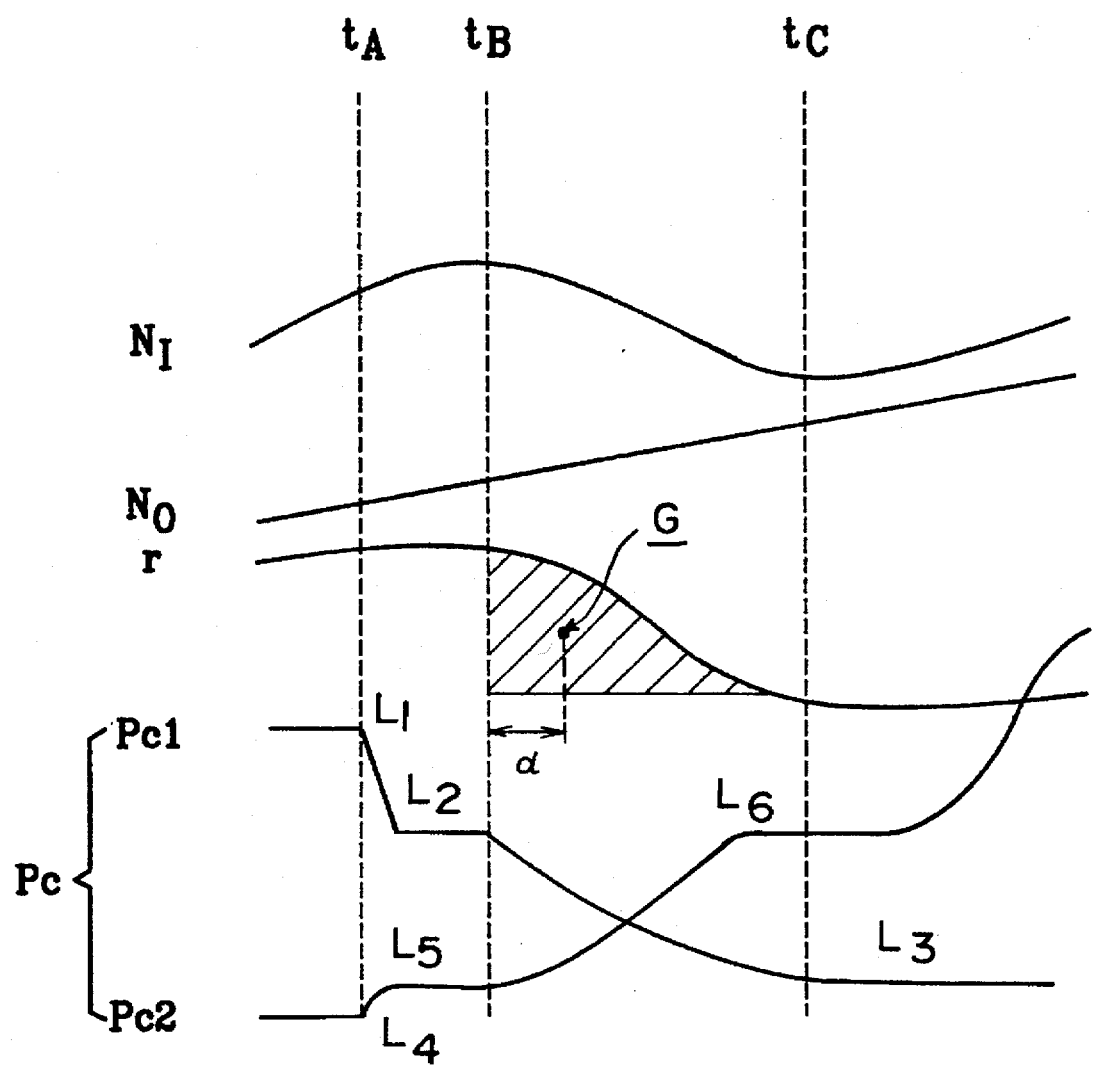
FIG. 2 is a time chart for operations of the shift control system of FIG. 1.

When a clutch switching shift is carried out by means of the first and second clutches as described above, the control unit 22 decides a speed based on detected traveling conditions, such as vehicle speed and throttle opening, and generates a shift signal at time $t_A$ as shown in FIG. 2. Then, a solenoid signal corresponding to the shift output is sent to each solenoid of the hydraulic circuit to turn On/Off the solenoid valves and to the linear solenoid valve 21 to generate the control hydraulic pressures Pc1 and Pc2 fed to the hydraulic servos C-1 and C-2.

The control hydraulic pressure Pc1 supplied to the hydraulic servo C-1, at level L1 before the shift signal, is reduced to level $L_2$ when the shift signal is generated at time $t_A$, is gradually further reduced when the shift is started at timing ts, and reaches level $L_3$ when the shift is completed at time $t_C$. On the other hand, the control hydraulic pressure Pc2 supplied to the hydraulic servo C-2 is at level $L_4$ before the shift signal is generated, is increased to level $L_5$ when the shift signal is generated at time $t_A$, is gradually further increased to level $L_6$ when the shift is started at time $t_B$, and the shift is completed at time $t_C$.

The input side rotary speed $N_I$ and the output side rotary speed $N_O$ change during the shift extending from time $t_B$ to time $t_C$ as shown in FIG. 2, when the control hydraulic pressures Pc1 and Pc2 supplied respectively to hydraulic servos C-1 and C-2 are controlled as described. That is, when the clutch switching shift is made from one speed to a higher speed while accelerating the vehicle, the input side speed $N_I$ drops along an S-shaped curve and the output side speed $N_O$ increases linearly, i.e. along a line of constant inclination, due to inertia of the vehicle. At this time, the gear ratio r drops as the input side speed $N_I$ drops and becomes constant after completion of the shift.

Figure 3:
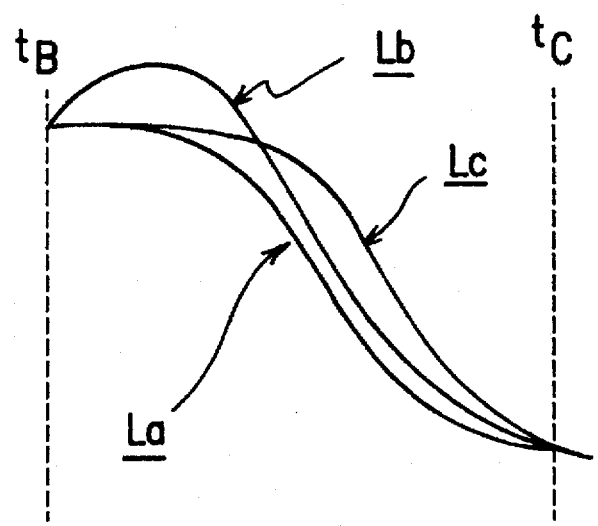
FIG. 3 is a graph of gear ratios according to the embodiment of FIG. 1.
Figure 4:
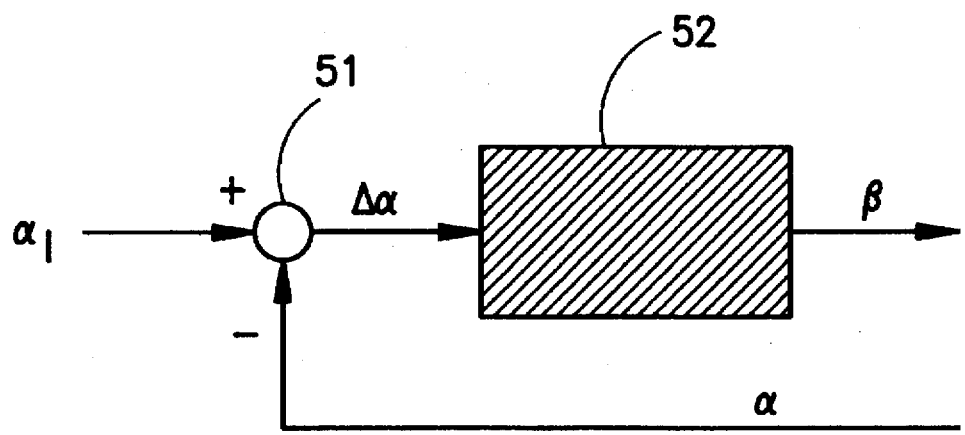
FIG. 4 is a block diagram of a hydraulic pressure command value generating means utilized in the embodiment of FIG. 1.

When neither engine racing nor tie-up occurs during the shift between times and $t_B$ to $t_C$, the gear ratio r changes along an ideal gear ratio curve La as shown in FIG. 3. However, when engine racing occurs, the gear ratio r becomes greater than the ideal value immediately after the time $t_B$ and changes along a gear ratio curve Lb. When tie-up occurs, the gear ratio r does not become small until near time $t_C$ and changes along a gear ratio curve Lc.

The shift characteristic value calculating means 34 calculates the shift characteristic value α which is an index representative of the actual shift characteristic, i.e., an index representing the difference between the actual gear ratio r and the corresponding value on the ideal gear ratio curve La. According to the present embodiment, the centroid of the area indicated as shaded (cross-hatched) in FIG. 2 is taken as the shift characteristic value α and is calculated based on the gear ratio r in accordance to the following equations (1), (2) and (3):

$$A = \int_0^v r(t)dt \quad (1)$$

$$C = \int_0^v r(t) \cdot t\, dt \quad (2)$$

$$\alpha = \frac{\int_0^v r(t) \cdot t\, dt}{\int_0^v r(t) \cdot dt} \quad (3)$$

Wherein: time is represented as t, time when the shift is ended as V and the gear ratio r at each time t as r(t). A is the area (hereinafter referred to as "gear ratio area") A of a domain or area under a curve for the actual gear ratio r, from the start of the shift to the current time t (the cross-hatched area in FIG. 2) and may be calculated by the equation (1). C is a moment from the start of the shift to the current time t and is calculated by equation (2).

Accordingly, because the shift characteristic value α is equal to C/A, it may be calculated by equation (3).

It is noted that the position of the center of gravity (centroid) G is represented by percentage: the position of G at time $t_B$ when the shift is started as being 0% and the position at the time $t_C$ when the shift is completed being 100%.

The control value generating means 35 performs feedback control or learning control by utilizing the shift characteristic value αI of the ideal gear ratio curve La as a command value and the shift characteristic value α of the gear ratio curve of the actual gear ratio r as an input and outputs a control value β to the shift logic setting means 36. In this preferred embodiment, the control value generating means 35 comprises a subtracter 51 and a control element 52 for performing the feedback control. Thus, the shift characteristic value αI (the command value) and the shift characteristic value α (input value) are input to the subtracter 51 which computes deviation Δα by subtracting the shift characteristic value α from the shift characteristic value αI, and outputs Δα to the control element 52. The control element 52 then multiplies the input deviation Δα by a control gain such as a proportion gain or storage gain and thereby obtains and outputs the control value β.

For example, when the shift characteristic value αI is 33.3%, a shift characteristic value α exceeding 33.3% can be taken as indication that tie-up has occurred.

The level of an arbitrary point in the set pattern (hereinafter referred to as "set control pattern") of the control hydraulic pressures Pc1 and Pc2 may be set as the control value β and, in the present embodiment, at least either the level L2 which is the stand-by hydraulic pressure just before the disengagement of the first clutch on the disengagement side or the level $L_5$ which is the stand-by hydraulic pressure just before the engagement of the second clutch on the engagement side is set as the control value β.

When the shift characteristic value calculated by the shift characteristic value calculating means 34 is greater than the shift characteristic value αI on the ideal gear ratio curve La, at least one of the control value β of the level $L_2$ and that of the level $L_5$ is reduced and, when the shift characteristic value calculated by the shift characteristic value calculating means 34 is less than the shift characteristic value αI, at least one of the control value of the level $L_2$ and that of the level $L_5$ is increased.

The shift logic setting means 36 corrects the hydraulic control pattern in accordance with the control value β and outputs the corrected hydraulic control pattern to the current control means 37 as a hydraulic control signal SG1. Receiving the hydraulic control signal SG1, the current control means 37 outputs a command current value $I_1$ for the hydraulic servo C-1 and a command current value $I_2$ for the hydraulic servo C-2 to the linear solenoid valve 21.

Because the actual gear ratio r can be changed along the ideal gear ratio curve La by correcting the hydraulic control pattern so that the shift characteristic value αI coincides with the shift characteristic value α, neither engine racing nor tie-up occurs during the clutch switching shift, thus maintaining driving comfort. Further, because the gear ratio r during the transition of the shift is changed along the ideal gear ratio curve La, the shift is smooth.

Figure 5:
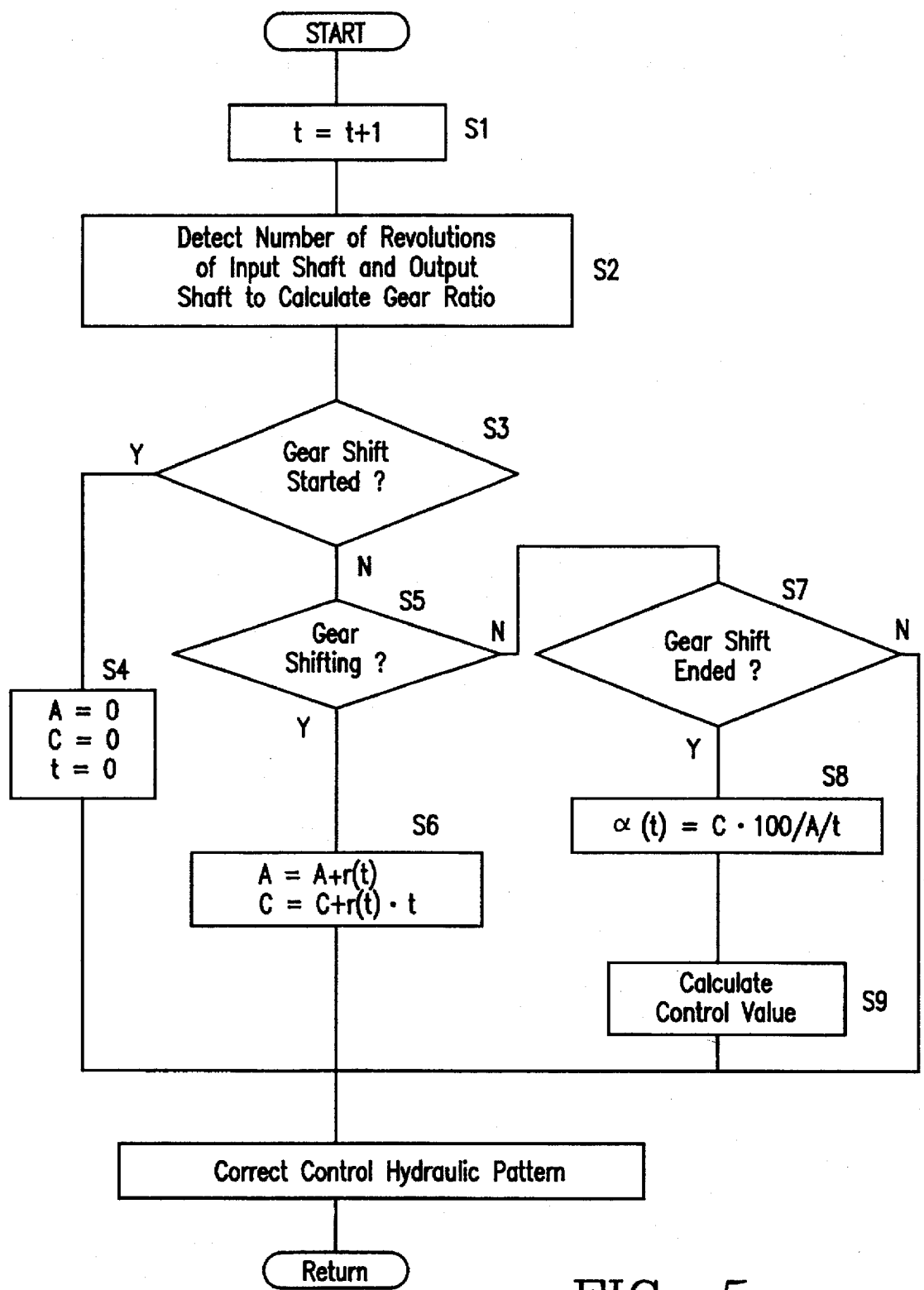
FIG. 5 is a flow chart of a control routine for operation of the shift control system of FIG. 1.

Operation of the shift control system of the above-described embodiment will now be explained with reference to the flow chart of FIG. 5 wherein:

Step S1: Increment sampling time t. The sampling time t is in increments of 10 milliseconds in the present embodiment;

Step S2: Calculate gear ratio r by detecting input side revolution $N_I$ and output side revolution $N_O$;

Step S3: Determine whether or not the transmission 16 (in FIG. 1) has started a shift at the present sampling time t. Advance to Step S4 when it has started the shift. When it has not, advance to Step S5;

Step S4: Set gear ratio area A, moment C and sampling time t at zero;

Step S5: Determine whether or not the transmission 16 is changing gears at the current sampling time t. Advance to Step S6 when it is changing gears and if not, advance to Step S7;

Step S6: Update the gear ratio area A and the moment C as follows:

$$A=A+r(t)$$

$$C=C+r(t) \cdot t$$

That is, the gear ratio r:r=r(t) at the current sampling time t is added to the gear ratio area A and the value r(t)·t, i.e. the gear ratio r multiplied by the current sampling time t, is added to the moment C.

Step S7: Determine whether or not the transmission 16 has ended the shift at the current sampling time t. When it has ended the shift, advance to Step S8 and it has not, advance to Step S10;

Step S8: Calculate and update the shift characteristic value α at the current sampling time t in accordance with the following expression:

$$\alpha = C \cdot 100/A/t$$

Step S9: Calculate the control value β; and

Step S10: Correct the hydraulic control pattern based on the control value β.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A shift control system for an automatic transmission having a plurality of frictional engagement elements for performing shifts from one gear ratio to a second gear ratio by disengagement of a first of said frictional engagement elements and engagement of a second of said frictional engagement elements, said control system comprising:

a plurality of hydraulic servos for engaging and disengaging said plurality of frictional engaging elements;

engaging force control means for controlling supply and draining of hydraulic pressure to and from said plurality of hydraulic servos independently;

gear ratio calculating means for calculating the gear ratio of said transmission;

shift characteristic value calculating means for calculating an actual shift characteristic value based on changes of the gear ratio during the shift; and control value generating means for calculating a control value based on (1) the actual shift characteristic value calculated by said shift characteristic value calculating means and (2) an ideal a shift characteristic value which corresponds to an ideal gear ratio curve for the shift;

said engaging force control means controlling the supply and draining of hydraulic pressure to and from said hydraulic servos operating said first and second frictional engagement elements, in accordance with said control value.

2. The shift control system according to claim 1, wherein said control value generating means compares said actual shift characteristic value with said ideal shift characteristic value, reduces a stand-by value to obtain said control value when said actual shift characteristic value is greater than said ideal shift characteristic value and increases a stand-by value to obtain said control value when said shift characteristic value is less than said ideal shift characteristic value.

3. The shift control system according to claim 2 wherein said stand-by value is hydraulic pressure within one of said hydraulic servos for disengaging said first frictional engagement element immediately prior to initiation of disengagement of said first frictional engagement element.

4. The shift control system according to claim 2, wherein said stand-by value is hydraulic pressure within one of said hydraulic servos for engaging said second frictional engagement element immediately prior to initiation of engagement of said second frictional engagement element.

5. The shift control system according to claim 2, wherein said shift characteristic value is the centroid of an area under a curve followed by the calculated gear ratio between the start of the shift and the completion of the shift.

6. The shift control system according to claim 5, wherein said position of said centroid is represented as a percentage, with the position of said centroid at the initiation of said shift being 0% and the position of the centroid at the completion of said shift being 100%.

7. The shift control system according to claim 6, wherein said engaging force control means is a linear solenoid.

8. The shift control system according to claim 6, further comprising:

input rotary speed detecting means for detecting rotary speed of an input shaft;

output rotary speed detecting means for detecting rotary speed of an output shaft; and wherein said gear ratio calculating means calculates the gear ratio based on signals from said input rotary speed detecting means and said output rotary speed detecting means.

* * * * *